US00RE49132E

(19) United States
(12) Reissued Patent
Ringdahl

(10) Patent Number: US RE49,132 E
(45) Date of Reissued Patent: Jul. 12, 2022

(54) RADAR ALTIMETER

(71) Applicant: Honeywell International Inc., Charlotte, NC (US)

(72) Inventor: Robert M. Ringdahl, Scottsdale, AZ (US)

(73) Assignee: Honeywell International Inc., Charlotte, NC (US)

(21) Appl. No.: 17/006,350

(22) Filed: Aug. 28, 2020

Related U.S. Patent Documents

Reissue of:
(64) Patent No.: 10,488,511
Issued: Nov. 26, 2019
Appl. No.: 06/572,286
Filed: Jan. 20, 1984

(51) Int. Cl.
*G01S 13/02* (2006.01)
*G01S 13/88* (2006.01)
*G01S 7/40* (2006.01)

(52) U.S. Cl.
CPC ..... *G01S 13/882* (2013.01); *G01S 7/4008* (2013.01)

(58) Field of Classification Search
CPC ..... G01S 13/882; G01S 7/4008
See application file for complete search history.

(56) References Cited

U.S. PATENT DOCUMENTS 3,098,225 A * 7/1963 Anderson ..... G01S 11/06 342/122
3,381,292 A * 4/1968 Hansen ..... 343/7.5 X
3,522,605 A * 8/1970 Mader et al. ..... 343/18 E

OTHER PUBLICATIONS

U.S. Patent and Trademark Office, "Office Action", U.S. Appl. No. 06/572,286, dated Aug. 5, 1986, pp. 1-4, Published: US.
Schlesinger et al., "Principles of Electronic Warfare", Prentice-Hall, Inc., 1961, 4 Pages, Englewood Cliffs, New Jersey.
U.S. Patent and Trademark Office, "Notice of Allowance", U.S. Appl. No. 06/572,286, dated May 28, 2019, pp. 1-6, Published: US.
Schlesinger et al, *Principles of Electronic Wafare*, 1961 by Prentice-Hall, p. 144.*

* cited by examiner

*Primary Examiner* — Mark Sager
(74) *Attorney, Agent, or Firm* — Fogg & Powers LLC

(57) ABSTRACT

A radar system operates at a carrier frequency near the oxygen absorption line. A selected range bin is monitored to measure the signal-to-noise ratio. The signal-to-noise ratio value is used to adjust the carrier frequency so as to maintain a preselected signal-to-noise ratio.

20 Claims, 1 Drawing Sheet

RADAR ALTIMETER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This Reissue application is a reissue of application Ser. No. 06/572,286, filed Jan. 20, 1984, which is incorporated by reference herein.*

This invention is concerned with radar type altimeters. Specifically, the radar altimeter of the present invention is one which maintains a signal to noise level below a value which affords detection by an intercept receiver.

Radar altimeters are well known. In order to provide covert operation, i.e. not detectable by an intercept receiver, the radar signal should be a minimum to reduce the chances of radar detection by the intercept receiver.

The novel radar system of the present invention provides a radar altimeter which operates near the oxygen absorption line. The frequency of the transmitter is adjusted in accordance with a measurement of the signal to noise ratio of a preselected range bin (return signal) thereby minimizing detection by an intercept receiver.

DESCRIPTION OF THE DRAWINGS

As shown in FIG. 1, atmospheric attenuation of a radar signal is near a maximum when the transmitter frequency is at 60 GHz. It should be noted that FIG. 1 is presented as a representation and is not intended to be a detailed and exact graph of frequency versus absorption. Nevertheless, it can be seen that a change of 8 DB/KM (one way) attenuation occurs by changing the radar frequency from 53 GHz to 57 GHz. Thus, large changes in attenuation are obtainable from small variations in the transmitter frequency, i.e. 4 GHz.

FIG. 2 shows a diagrammatic representation of intercept receiver signal noise ratio versus range from the transmitter. FIG. 2 illustrates the differences between signal noise ratio for microwave signals 20 and GHz signals 25. A constant signal to noise ratio of 15 DB line is shown on the graph. A microwave transmitter can be detected at 15 dB signal to noise ratio at 800 K feet. However, at a frequency in the order of 55 GHz, this detection range is reduced to about 60 K feet (10 nautical miles). As noted in FIG. 2, by automatically shifting the transmitter frequency by 1 GHz, the intercept receiver range reduces to less than 20 K feet. In other words, the intercept detection range is reduced by over 40 times as compared with a microwave system.

Figure 3:
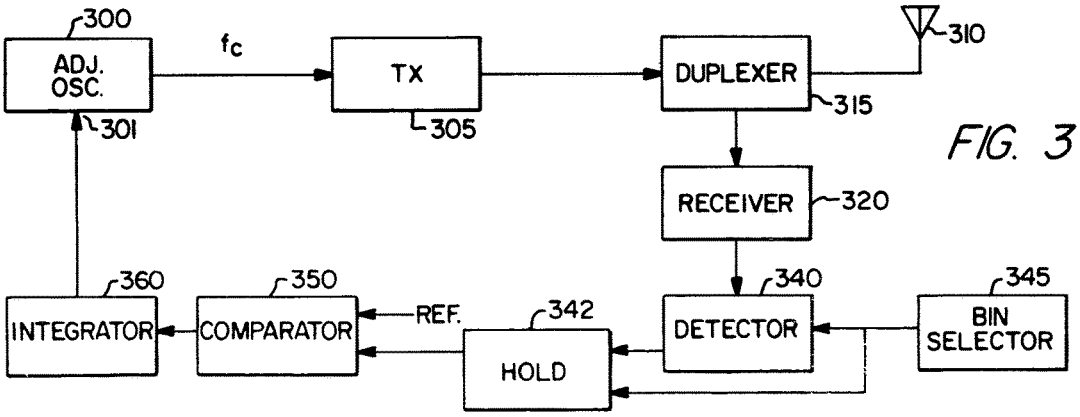
FIG. 3 is a block diagram of one embodiment of the invention of the present application.

Shown in FIG. 3 is a schematic block diagram which illustrates the principles of the invention of the present application. Oscillator 300 provides a carrier signal to be transmitted by transmitter 305 for subsequent transmission through antenna 310 via duplexer 315. Oscillator 300 includes a control input 301 to vary the carrier signal frequency to some extent.

By way of example, the radar system shown in FIG. 3 is an altimeter. Altimeter return signals are received by antenna 310 and processed through duplexer 315 which feeds receiver 320. The output from receiver 320 is fed into signal-to-noise detector 340.

The output of detector 340 is presented to a hold circuit 342 for holding the value of the signal-to-noise ratio upon a predetermined bin selection provided by the output of bin selector 345. The output of hold circuit 342 is then presented as one input to comparator 350. Comparator 350 compares the output of hold circuit 342 to a preselected reference level input. The comparator provides an output signal to integrator 360 which integrates the output signal of comparator 350. The output of integrator 360 is then presented to the control input 301 of oscillator 300 for adjusting the oscillation frequency, i.e. the carrier frequency in proportion to the output of integrator 360.

The operation of the radar system of FIG. 3 will now be described. The reference signal is a signal representative of a predetermined acceptable signal-to-noise ratio which affords only limited detection by an intercept receiver at a predetermined range. Oscillator 300 provides a signal in the order of, for example, 55 GHz which is subsequently transmitted over antenna 310 through transmitter 305 and duplexer 315. Return signals, in time, are operated on by receiver 320 for usual altimeter range determination. Receiver 320 provides the usual amplification and detection circuits necessary for standard altimeters. An output of receiver 320 is provided to detector 340 which provides signal-to-noise detection in the usual manner well known in the art of radio signals. The output of detector 340, a signal indicative of the signal-to-noise ratio, is presented to hold circuit 342 which will hold the value of the signal-to-noise detector 340 when the holding circuit 342 is gated by bin selector 345. Gating occurs upon a predetermined range which usually would be the maximum range desired in the operating system.

The output of the holding circuit 342 is then presented to comparator 350 which is compared with the reference signal indicative of the preselected acceptable signal to noise ratio. The output of the comparator is then integrated via integrator 360 and presented to the adjustable oscillator 300 for adjusting the oscillation so as to increase or decrease as the case may be to maintain the preselected signal to noise ratio. The combination of comparator 350 and integrator 360 provides a negative feedback control means so as to maintain the signal-to-noise ratio as aforesaid.

Figure 1:
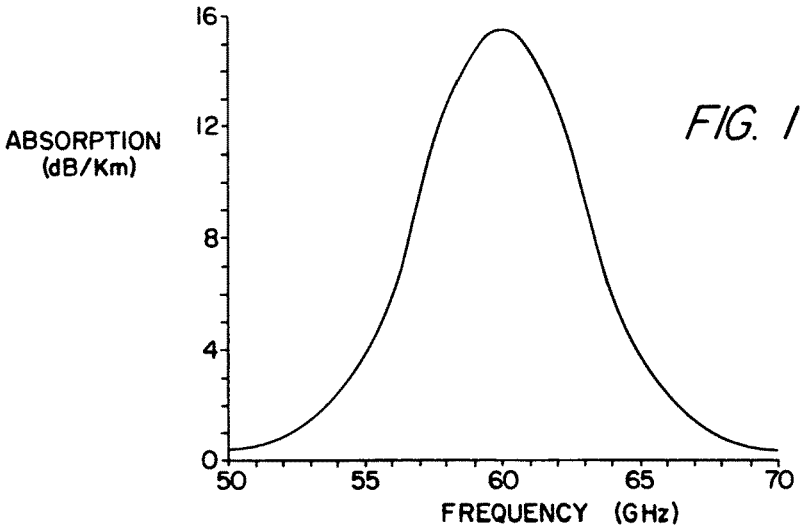
FIG. 1 is a graphical representation of signal absorption versus frequency.
Figure 2:
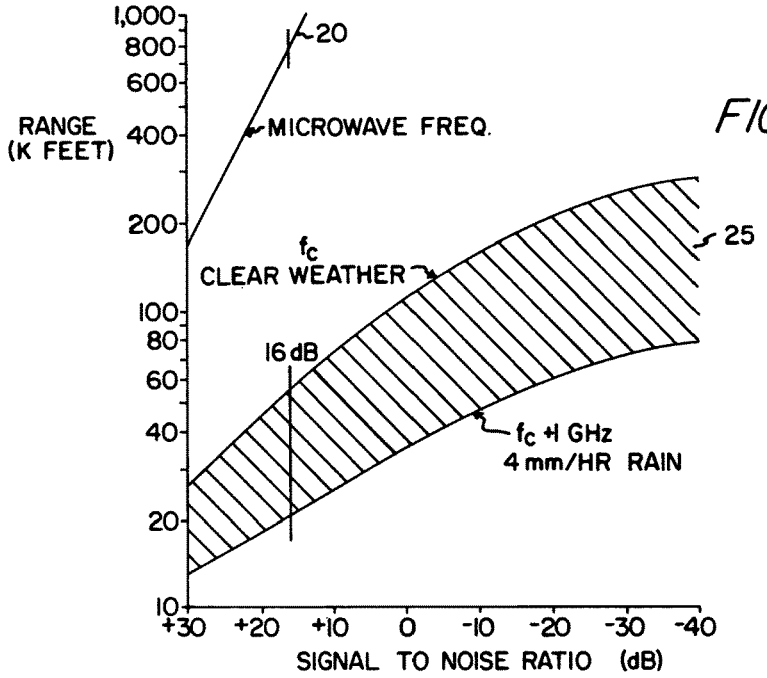
FIG. 2 is a diagrammatic representation of intercept receiver signal to noise ratio versus range measured from the transmitter.

It will be appreciated by those skilled in the art that the embodiment shown in FIG. 2 is applicable to a wide range of radar systems including FM/CW, pulsed radar systems, and the like. Such systems are envisioned to be within the scope of the present application and are diagrammatically represented by a transmitter block 305. Similarly, dependent upon the system employed, receiver 320 is constructed in the manner to be compatible with the method of transmission by transmitter 305.

The embodiments of the invention in which an exclusive property or right is claimed are defined as follows:

1. A radar system comprising:

oscillator means for providing a high frequency signal having a frequency near the oxygen absorption frequency, said oscillator *means* having means for adjusting said high frequency signal in response to a control signal;

means for transmitting said high frequency signal through the atmosphere;

means for receiving a reflected signal of said transmitted high frequency signal;

means for detecting [the] *a* signal-to-noise ratio of said reflected high frequency signal at a preselected time after said transmission of said high frequency signal;

means for comparing said signal-to-noise ratio with a preselected signal to noise ratio value and providing an output signal indicative of the difference thereof;

feedback control means for providing said control signal as a function of said [comparator] output signal.

2. The radar system of claim 1 wherein said feedback control means includes means responsive to said [comparator] output signal for maintaining said signal-to-noise ratio substantially equal to said preselected signal-to-noise ratio.

*3. The radar system of claim 1, wherein the high frequency signal is controlled using the control signal.*

*4. The radar system of claim 1, wherein a nominal transmitted frequency of the high frequency signal is from about 55 GHz to about 65 GHz.*

*5. The radar system of claim 1, wherein the radar system is a radar altimeter.*

*6. A radar system comprising:*

*an oscillator operative to generate a carrier signal, the oscillator including a control input;*

*a transmitter in operative communication with the oscillator, the transmitter configured to transmit the carrier signal to atmosphere;*

*a receiver operative to receive a reflected return signal of the transmitted carrier signal;*

*a detector in operative communication with the receiver, the detector configured to determine a signal-to-noise ratio of the reflected return signal; and*

*a comparator in operative communication with the detector, the comparator configured to compare the signal-to-noise ratio with a preselected signal-to-noise ratio value, and to provide an output signal indicative of the difference thereof;*

*wherein a control signal, which is generated based on the output signal from the comparator, is sent to the control input of the oscillator to adjust a frequency of the carrier signal.*

*7. The radar system of claim 6, wherein the frequency of the carrier signal is near an oxygen absorption frequency.*

*8. The radar system of claim 6, further comprising:*

*one or more antennas in operative communication with the transmitter and the receiver;*

*a bin selector in operative communication with the detector;*

*a peak-hold detector in operative communication with the bin selector, the peak-hold detector configured to hold a value of the signal-to-noise ratio upon a predetermined bin selection provided by the bin selector; and*

*an integrator operative to receive the output signal from the comparator, the integrator configured to generate the control signal.*

*9. The radar system of claim 8, wherein the one or more antennas are connected to the transmitter and the receiver through a duplexer.*

*10. The radar system of claim 8, wherein:*

*the comparator is in operative communication with the peak-hold detector and a preselected reference level input; and*

*the reference level input comprises a signal representative of a predetermined acceptable signal-to-noise ratio which affords only limited detection by an intercept receiver at a predetermined range.*

*11. The radar system of claim 7, wherein the signal-to-noise ratio is maintained below a value which affords detection by an intercept receiver at a predetermined range.*

*12. The radar system of claim 7, wherein the radar system comprises a radar altimeter.*

*13. The radar system of claim 7, wherein the radar system comprises a frequency-modulated continuous-wave (FM/CW) radar system.*

*14. The radar system of claim 7, wherein the radar system comprises a pulsed radar system.*

*15. A method of operating a radar system, the method comprising:*

*generating a carrier signal;*

*transmitting the carrier signal through the atmosphere;*

*receiving a reflected return signal of the transmitted carrier signal;*

*detecting a signal-to-noise ratio of the reflected return signal at a preselected time after transmitting the carrier signal;*

*comparing the signal-to-noise ratio of the reflected return signal with a preselected signal-to-noise ratio to generate an output signal indicative of the difference thereof;*

*generating a control signal as a function of the output signal; and*

*adjusting a frequency of the carrier signal in response to the control signal using a feedback control loop.*

*16. The method of claim 15, wherein the preselected time after transmitting the carrier signal is determined based on a round-trip time delay associated with the reflected return signal.*

*17. The method of claim 15, wherein the preselected signal-to-noise ratio is determined based on an acceptably low probability of detection of the transmitted carrier signal by an intercept receiver at a predetermined range.*

*18. The method of claim 15, further comprising:*

*monitoring a selected range bin to measure the signal-to-noise ratio of the reflected signal.*

*19. The method of claim 15, further comprising*

*controlling a frequency of the carrier signal such that the signal-to-noise ratio of the reflected return signal is substantially equal to the preselected signal-to-noise ratio.*

*20. The method of claim 15, wherein the frequency of the carrier signal is near an oxygen absorption frequency.*

* * * * *